United States Patent
Greenwood et al.

(10) Patent No.: US 7,173,613 B2
(45) Date of Patent: Feb. 6, 2007

(54) PERIPHERAL DEVICE INCLUDING A USER INTERFACE FOR CONTROLLING A COMPUTER SYSTEM UNIT OPTIONALLY ATTACHED TO THE PERIPHERAL DEVICE

(75) Inventors: Jennifer Lynn Greenwood, Durham, NC (US); James Stephen Rutledge, Durham, NC (US)

(73) Assignee: LenovoSingapore Pte Ltd, Singapore (SG)

( * ) Notice: Subject to any disclaimer, the term of this patent is extended or adjusted under 35 U.S.C. 154(b) by 558 days.

(21) Appl. No.: 10/674,777

(22) Filed: Sep. 30, 2003

(65) Prior Publication Data

US 2005/0078106 A1   Apr. 14, 2005

(51) Int. Cl.
*G09G 5/00* (2006.01)
*G06F 1/00* (2006.01)

(52) U.S. Cl. .................. 345/211; 713/330; 713/340
(58) Field of Classification Search ........ 345/156–168, 345/211–213; 710/62–74
See application file for complete search history.

(56) References Cited

U.S. PATENT DOCUMENTS

| | | | |
|---|---|---|---|
| 5,483,260 A | | 1/1996 | Parks et al. |
| 5,581,772 A | * | 12/1996 | Nanno et al. ............... 713/340 |
| 5,706,030 A | | 1/1998 | Ishigami et al. |
| 5,708,820 A | * | 1/1998 | Park et al. .................. 713/323 |
| 5,745,670 A | * | 4/1998 | Linde .......................... 714/22 |
| 5,786,813 A | * | 7/1998 | Kurikko ..................... 345/212 |
| 5,815,679 A | * | 9/1998 | Liu ............................. 710/311 |
| 5,923,099 A | * | 7/1999 | Bilir ............................ 307/64 |
| 5,938,772 A | * | 8/1999 | Welch ........................ 713/320 |
| 6,268,845 B1 | * | 7/2001 | Pariza et al. ................ 345/581 |
| 6,289,466 B1 | | 9/2001 | Bayramoglu et al. |
| 6,292,178 B1 | | 9/2001 | Bernstein et al. |
| 6,460,109 B1 | * | 10/2002 | Kaply et al. ................ 710/316 |
| 6,515,655 B1 | * | 2/2003 | Thornblad .................. 345/211 |
| 6,532,149 B2 | * | 3/2003 | Dhar et al. ................. 361/683 |
| 6,883,048 B2 | * | 4/2005 | Suwa et al. ................... 710/73 |

* cited by examiner

*Primary Examiner*—Richard Hjerpe
*Assistant Examiner*—M. Fatahiyar
(74) *Attorney, Agent, or Firm*—Ronald V. Davidge Inc.; Carlos Munoz-Bustamante

(57) ABSTRACT

A computer system includes a system unit and a peripheral device connected by an electrical connection. The peripheral device includes a main power switch that turns power off within both the peripheral device and the system unit, together with a drive indicator light that is turned on to indicate when data is being written or read at a hard disk drive within the system unit. Preferably, the peripheral device is a display device including a screen and receiving a video signal from the system unit, with a power indicator light indicating whether power is on and whether the system unit is running in an operational state or in a suspended state. The peripheral device can also be used with a system unit not having these capabilities.

19 Claims, 3 Drawing Sheets

PERIPHERAL DEVICE INCLUDING A USER INTERFACE FOR CONTROLLING A COMPUTER SYSTEM UNIT OPTIONALLY ATTACHED TO THE PERIPHERAL DEVICE

BACKGROUND OF THE INVENTION

1. Field of the Invention

This invention relates to a user interface to control and monitor basic functions of a computer system, and, more particularly, to providing such an interface on a peripheral device to which the computer system is optionally attached without affecting the functionality of the peripheral device when the computer system is not attached thereto.

2. Summary of the Background Art

Typical "desktop" computer systems include a system unit providing basic functions such as a microprocessor, data storage, and various forms of connectivity, together with a number of peripheral devices, which typically always include a display unit and a keyboard, and which often further include a printer, a scanner, and an additional form of data storage. Since the keyboard, pointing device, and display unit provide interfaces that are used throughout typical operation of the computer system, these peripheral devices are generally kept within easy reach of the user. On the other hand, the system unit does not need to provide such interfaces, particularly in an environment in which floppy diskettes, which have traditionally been inserted into a drive within the system unit, are being used with decreasing frequency, with data being more typically transmitted over wired or wireless networks.

The patent literature includes a number of descriptions of methods for providing a user interface at a display device and for transferring control information from the display device to the system unit of a computer system. For example, U.S. Pat. Nos. 6,268,845 and 6,289,466 describe a computer system including a display unit having a universal serial bus (USB) connection as well as a VGA connection with the base system unit. Multiple button and LED controls are conveniently placed on a front bezel of the monitor. As the buttons are actuated, commands are passed to the base system via the USB. An onscreen display button causes an application to be launched on the base system for modifying screen attributes stored in a monitor controller in the monitor. A USB controller in the monitor updates the monitor controller via the USB. A multifunction audio dial is toggled by a bezel button between volume, bass and treble functions. The USB controller is also operable to provide and sustain a blinking LED even while the base system is in a sleep state, with LEDs on the front bezel indicating monitor and base system power status.

U.S. Pat. No. 6,292,178 describes a display system configured to provide a user interface for use in ophthalmic surgery, with the display system having a screen and a bezel with a generally horizontal shelf aligned with the bottom of the screen and a generally vertical portion aligned with a side of the screen. A plurality of spaced apart switches is disposed on the horizontal shelf, with each switch being provided for activating a corresponding vertical display aligned with the switch on the screen. A sliding touch control panel, disposed in a continuous strip along the bezel vertical portion allows selections of functions and alphanumeric data appearing in a vertical display that can be presented on the screen. A computer attached to the display device is used for generating vertical displays generally parallel to the vertical display.

U.S. Pat. No. 5,483,260 describes a method and apparatus providing bi-directional communication between a video monitor and a computer system unit, without providing an additional user interface at the monitor. This method enables the video monitor to inform the system unit of its capabilities without direct user involvement and also enables the system unit to directly control or adjust all the functions of the video monitor. In the preferred embodiment, bi-directional communication between the video monitor and the system unit is provided utilizing a mouse port in the keyboard controller of the system unit. Multiplexers are coupled between the mouse port and each of the mouse and the video monitor to select between data paths and to selectively allow communications between the system unit and the video monitor.

What is needed is a way to provide for a user interface at a peripheral device, such as a display device, with the user interface providing at least a capability for turning a system unit attached to the display device off and on. Preferably, such a user interface is provided in a way that does not interfere with the use of the display device attached to a system unit not having a capability of being switched off and on in this way. Since such an interface must be capable of turning the system unit on, it should not rely on the execution of programs within the system unit for operation.

SUMMARY OF THE INVENTION

Accordingly, it is an objective of the invention to provide a peripheral unit with a user interface including a power switch turning both the peripheral device and a computer system unit attached to the peripheral device on and off.

It is another objective of the invention to provide such a user interface within a peripheral device with a drive indicator light indicating when data is written to or read from a hard disk drive within the system unit.

It is yet another objective of the invention to provide such a user interface within a display device with a power indicator light indicating whether power is turned on and whether the system unit is operating in an operational state or in a suspended state.

It is an additional objective of the invention to provide such an interface in a form having a minimal effect on the use of the peripheral device with a system unit not providing the features of the invention.

According to a first aspect of the invention, a computer system is provided, including a system unit, an electrical connection, and a peripheral device removably connected to the system unit by the electrical connection. The system unit has a system unit power supply system performing a process of supplying at least one voltage level to components within the system unit. The peripheral device includes a peripheral power supply system performing a process of supplying at least one voltage level to components within the peripheral device, and a main power switch electrically connected to the peripheral power supply system and to the system unit power supply system through the electrical connection to turn both of the power supply systems on and off.

Preferably, the system unit includes a hard disk drive and a disk adapter producing a drive indication signal whenever data is written to or read from the hard disk drive. Preferably, the peripheral device includes a drive indicator light that is illuminated through a line extending within the electrical connection whenever the drive indication signal is present.

Preferably, the system unit runs in an operational state and in a suspended state. Preferably, the peripheral device is a display device having a capability for recognizing whether the system unit is running in the operational state or in the suspended state, and additionally including a power indication light giving a first indication when the system unit is running in the operational state and a second indication when the system unit is running in the suspended state.

DETAILED DESCRIPTION OF THE INVENTION

Figure 1:
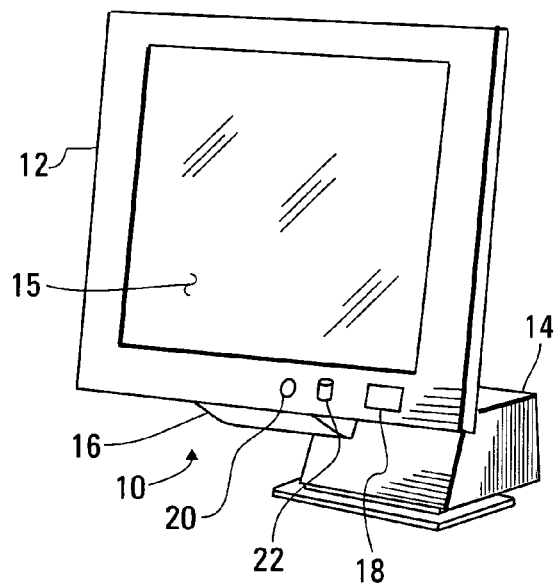
FIG. 1 is a perspective view of a computer system including a first type of peripheral device in which the invention is implemented.

FIG. 1 is a perspective view of a computer system 10 including a first type of peripheral device 12, in which the invention is implemented, and a system unit 14. In this exemplary configuration, the peripheral device 12 is a display device, having an LCD screen 15, attached to the system unit 14 by means of an adjustable display mounting mechanism 16. The peripheral device 12 is also electrically connected to the system unit 10 by means of an electrical connection (not shown).

In accordance with the invention, the peripheral device 12 includes a power switch 18 that is used to apply electrical power both to circuits within the peripheral device 12 and the system unit 14, a power indicator light 20 that is turned on when electrical power is turned on to the circuits within the peripheral device 12, and a drive indicator light 22 that is turned on when data is being written to or read from a hard disk drive within the system unit 14. Preferably, the power indicator light 20 provides a first indication, such as a steady light, when the computer system 10 is in an operational state, and a second indication, such as a flashing light, when the computer system 10 is in a not-ready state, such as a sleep state. This switch 18 and the indicator lights 20, 22 are located on the peripheral device 12, instead of on the system unit 14, because the peripheral device 12 is located in a position that is more convenient for the placement of the operator interface, being above and in front of the system unit 14.

Alternately, the peripheral device 12 may be electrically disconnected from the system unit 14 and connected to another system unit (not shown) to operate as a display device in response to the other system unit. This can be achieved without disconnecting the peripheral device 12 from the mechanical support provided by the system unit 14 and the associated mounting mechanism 16. If the peripheral device 12 is connected in this way to a system unit not having features of the invention, the power switch 18 will only turn on power within the peripheral device 12; a power switch on the system unit must be used to turn power off or on within the system unit. Additionally, a system unit not having the features of the invention will not provide a means to operate the drive indicator light 22, so this light will remain off regardless of the operational state of the hard disk drive within the system unit.

On the other hand, many of the display devices commercially available today have a means for detecting whether a system unit to which the display device is connected is providing a signal to drive the display. Such a signal is present when the display device is in an operational state but not when it is in a sleep state. When this signal is present with the display unit on, the conventional display provides a first indication, such as a green light. When this signal is not present with the display on, the conventional display provides a second indication, such as a yellow light. Therefore, by using a conventional method for detecting the operational state of the system unit to which the peripheral device 12 is connected, the peripheral device 10 receives the information needed to provide the same indications through the power light 20, whether or not the system unit includes the features of the invention.

Figure 2:
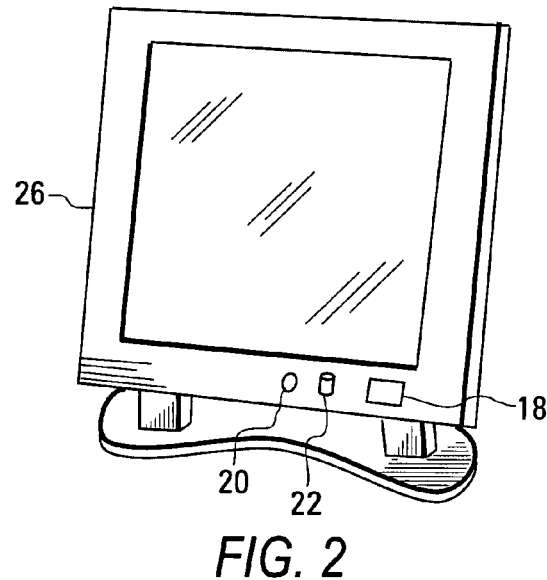
FIG. 2 is a perspective view of a second type of peripheral device in which the invention is implemented.

FIG. 2 is a perspective view of a second type of peripheral device 26 in which the invention is implemented. For example, this peripheral device 20 is a display device not mechanically connected to a system unit, but still electrically connected to a system unit by means of an electrical connection (not shown). The peripheral device 26 includes a power switch 18 and indicator lights 20 and 22 as described above in reference to FIG. 1, which are therefore accorded like reference numerals.

The peripheral device 26 may be connected by an electrical cable to a system unit (not shown) having the features of this invention, so that the switch 22 turns electrical power on and off to circuits within the system unit as well as within the peripheral device 26, and so that the drive indicator light 22 is turned on to indicate operation of a hard disk drive within the system unit. Alternately, the peripheral device 26 may be connected by an electrical cable to a system unit (not shown) not built in accordance with the invention, so that the switch 22 turns electrical power on and off only to circuits within the peripheral device 26, and so that the drive indicator light 22 is not functional. On the other hand, conventional means are preferably used to determine whether the system unit is in a suspend state, so that the power indication light 22 provides a different indication under this condition, even if the system unit is not built in accordance with this invention.

Figure 3:
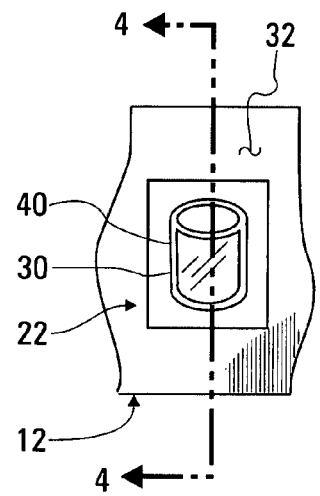
FIG. 3 is a fragmentary front view of the peripheral unit of FIG. 1, showing an indicator light operated in response to a system unit connected thereto.

An exemplary configuration of the drive indicator light 22 will now be explained, with particular reference being made to FIGS. 3 and 4. FIG. 3 is a fragmentary front view of the peripheral device 12, taken to show the drive indicator light 22, and FIG. 4 is a fragmentary cross-sectional view of the peripheral device 12, taken as indicated by section line 4—4 in FIG. 3.

Since the drive indicator light 22 is non functional in some configurations, it is preferably of a type that is readily apparent only when it is turned on. For example, the drive indicator light 22 includes translucent or transparent window 30 having an appearance similar to the surrounding cover 32 of the peripheral device 12. When an LED 34, mounted on a circuit board 35 and held within a housing 36 behind the window 30, is turned on the window 30 is illuminated through a mask 38 providing an image 40 representing the hard drive function, such as a cylinder. Alternately, a simple round or rectangular image may be illuminated to provide an indication of hard file operation within the system unit 14. The mask 38 preferably is composed of a n opaque material presenting a surface having a color close to the color of the adjacent cover surface 32 toward the window 38. The mask 38 may be a separate part or a surface formed, for example, by printing an image on the inside of the window 30 using a silk screen process. The window 30 may also be tinted to match the color of the adjacent cover surface 32. For example, if the adjacent cover surface is black, the window 30 may be clear and transparent, with the mask 38 being printed in black, and with a cavity 42 and the LED 34 beubg colored green to provide a green indication when the LED 34 is switched on. When the LED 34 is not switched on, the space within the cavity 42 is dark enough to appear black.

Figure 4:
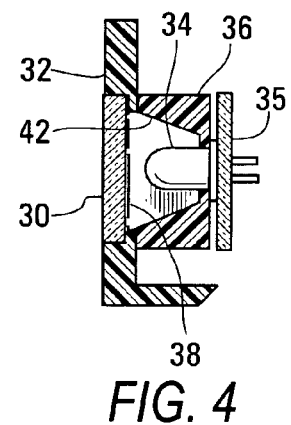
FIG. 4 is a vertical cross-sectional view of the indicator light of FIG. 3, taken as indicated by section line 4—4 therein.

Preferably, the alternate display device 26 also has a drive indicator light 22 composed as described in reference to FIGS. 3 and 4.

Figure 5:
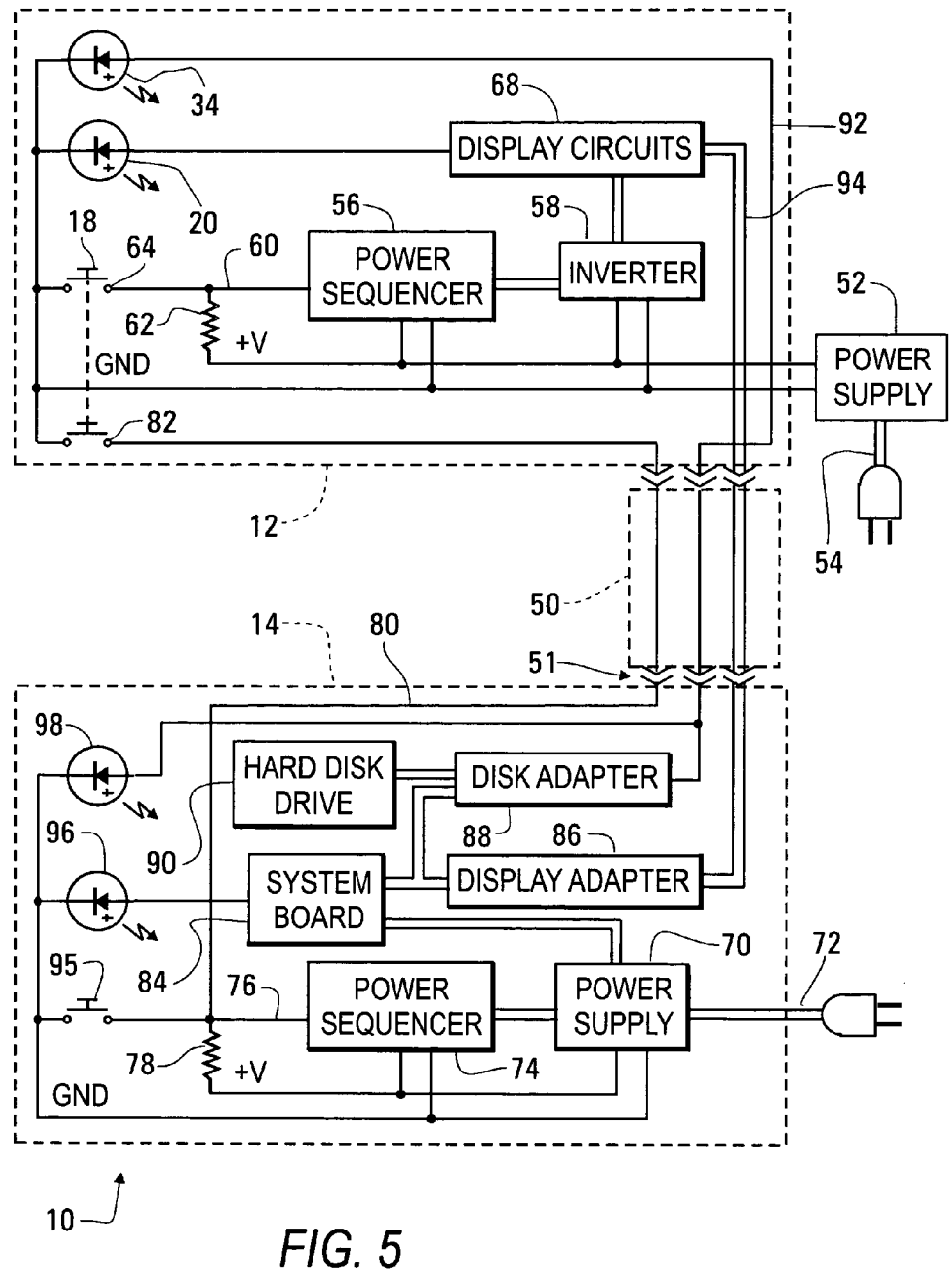
FIG. 5 is a schematic view of the computer system of FIG. 1.

FIG. 5 is a schematic view of the computer system 10, showing functional elements within the peripheral device 12, within the system unit 14, and within an interconnecting cable 50 removably connecting the device 12 with the unit 14. The interconnecting cable 50 includes contacts 51 at either or both of its ends.

Electrical power for the peripheral device 12 is supplied through an external power supply 52, connected to line voltage through a line cord 54, with a DC output from the power supply 52 at a first switching voltage +V being provided as a power input to a power sequencer 56 and an inverter 58 within the peripheral device 12. The power sequencer 56 also has an input provided through a first power switching line 60 that is connected to the power supply voltage +V through a resistor 62, and to electrical ground through switch contacts 64 when the power switch 18 is depressed. The power sequencer 56 produces outputs on a number of lines 66, turned on in accordance with a predetermined timing sequence when the power switch 18 is momentarily depressed to pull the voltage of the first power switching line 60 down to a ground potential within the peripheral device 12. Each of these outputs on the lines 66 is associated with a particular voltage generated within the inverter 58 by DC-to-DC conversion from the +V output voltage of power supply 52. The various voltages produced within the inverter 58 are used to drive a number of circuits within display circuits 68 to operate all functions of the peripheral device 12. Thus, the peripheral device 12 has a power supply system that includes the external power supply 52, the power sequencer 56, and the inverter 58

Preferably, after the first power switching line 60 is momentarily driven to electrical ground by the depression of switch 18, the outputs of the power sequencer 56 on lines 66 are turned on in a predetermined sequence so that the power outputs of the inverter 68 then appear in a preferred sequence. These outputs of the power sequencer 56 and the corresponding voltages produced by the inverter 58 then remain on as long as external power remains on from the power supply 52, until power within the peripheral device 12 is turned of by holding the power switch 18 depressed for a longer time, such as four seconds. Holding the first power switching line 60 at electrical ground for this longer time causes the outputs from the power sequencer on line 66 to shut off, with the corresponding output voltages from the inverter 68 also being shut off.

Electrical power within the system unit 14 is supplied through an internal power supply 70 that is connected to line voltage through a line cord 72. The system unit 14 also includes a power sequencer 74 that operates in a similar fashion to the previously described power sequencer 56 to turn on voltage levels supplied by the power supply 70 in response to momentarily grounding an input line 76. The input line 76 is otherwise held at a second switching voltage +V through a resistor 78 by means of a voltage supplied by the power supply 70 whenever power is available through the line cord 72, even if other outputs of the power supply 70 have been switched off.

When the power switch 18 in the peripheral device 12 is momentarily depressed, a second power switching line 80 extending through the interconnecting cable 50 is switched to electrical ground through contacts 82 of the power switch 18. Since this second power switching line 80 is additionally connected to the input line 76 of the power sequencer 74, a momentary application of electrical ground through the switch contacts 82 causes the power sequencer 74 to provide signals causing the power supply 70 to turn on voltage levels according to a predetermined sequence. Also, the depression of the power switch 18 for a longer time, such as four seconds, causes these signals from the power sequencer 74 to the power supply 70 to be turned off, so that the voltage level outputs of the power supply 70 are turned off, except for the +V output, which is left on.

The system unit 14 also has conventional computer devices, such as a system board 84, a display adapter 86, a disk adapter 88, and a hard disk drive 90, which are provided with electrical power from the power supply 70. The disk adapter 88 provides a signal on an output line 92, which extends through the interconnect cable 50 to drive the LED 34 within the drive indicator light 22 whenever data is being written or read within the hard disk drive 90. The display adapter 86 generates a number of conventional signals used to drive the display circuits 68, with these signals being directed through a number of video signal lines 94, additionally extending through the interconnecting cable 50.

Preferably, the system unit 14 is of a type including at least one reduced-power state that is characterized by a lower usage of electrical power and by a recognizable variation in the conventional signals driven along lines 94 to the display circuits 68. For example, the system unit 14 may be built according to the Display Power Management Standard (DPMS) to use the two synchronizing signals driven along lines 94 to differentiate between an operational state, in which normal operation occurs within both the system unit 14 and the peripheral unit 12, an optional standby state in which some systems are shut down to conserve power, and a suspend state, in which more systems are shut down for substantial power conservation. In normal operation, both the horizontal and vertical synch signals are present. If the standby state is provided, it is indicated to the peripheral unit 12 by turning off the horizontal synch signal. In the suspend state, the horizontal synch signal is left on, but the video signal and the vertical synch signal are turned off. Preferably, the display circuits 68 within the peripheral device 12, sensing such changes, provide an image on the LCD screen 15 only in the normal state and a signal driving the power indicator light 20 to provide a steady "on" indication only during normal operation. These display circuits 68 then provide a signal causing the power indicator light 20 to flash during the suspend state and additionally during the standby state, if it is provided.

The system unit 14 may additionally include a second power switch 95, which can be depressed to connect input line 76 to electrical ground, so that power within the system unit 14 to be turned on and off when the peripheral device 12 is not connected to the system unit 14. The system unit 14 may additionally include a second power light 96, driven by circuits within the system board 84 to provide one or more power on indications, and a second drive indicator light 98, driven by the disk adapter 88 to provide an indication that data is being read or written at the hard disk drive 90, again when the peripheral device 12 is not connected to the system unit 14.

For example, the interconnecting cable 50 and associated connectors may be built in accordance with the DVI (Digital Video Interface) standard, providing 24 lines, which can be configured to include the video signal lines 94, along with the second power switching line 80 and the drive indicator line 92.

While various features of the invention have been discussed in reference to FIG. 5 in terms of the computer system 10 of FIG. 1, including a system unit 14 mechanically attached to the peripheral device 12, it is understood that the features described in reference to FIG. 5 can readily be included in a system unit 14 connected to the alternate peripheral device 26 by only a cable, such as the interface cable 50, without departing from the spirit and scope of the invention. It is further understood that the system unit 14 and the peripheral device 12 are generally disconnectable by means of connectors at either or both ends of the cable 50, and that the system unit 14 and peripheral device 12 are separately operable when disconnected. A particular advantage of the invention is achieved when the peripheral device 12 is operated separately from the system unit 14, but in connection with a system unit not having the features of the invention; a voltage is not present on lines 92 and 80 at the connector of the display device 12.

Figure 6:
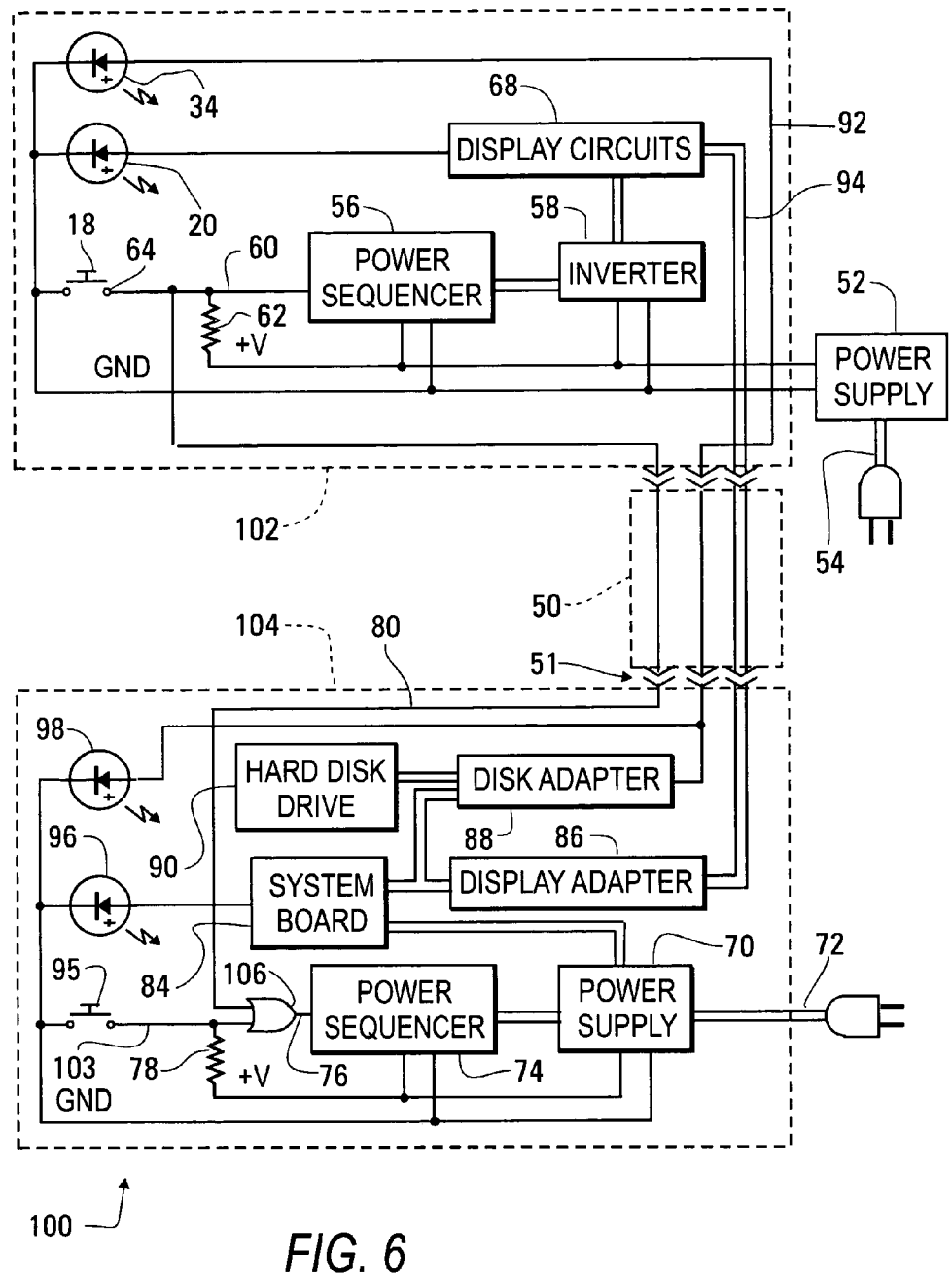
FIG. 6 is a schematic view of a computer system built in accordance with an alternate version of the invention.

FIG. 6 is a schematic view of a computer system 100 built in accordance with an alternate version of the invention, including a peripheral device 102 and a system unit 104. The computer system 100 is similar to the computer system 10, with like elements being afforded like reference numbers. Within the peripheral device 102, the second power switching input line 80 is connected to the same switch contacts 64 as the first power switching line 60 to the power sequencer 56 of the peripheral device 102. Within the system unit 104, the power switching input line 80 and a third power switching line 103 from the contacts of the auxiliary power switch 95 are connected as separate inputs to an OR gate 106, so that depressing either the power switch 18 of the peripheral device 102 or the power switch 104 turns the system unit 104 on or off as previously described. Compared to the version of the invention described above in reference to FIG. 5, this version has a disadvantage, when the peripheral device 102 and the system unit 104 are disconnected from one another, of leaving the +V voltage on the contact of the line 80 between the peripheral device 80 and the cable 50. On the other hand, an advantage is provided under this condition, since this voltage is not left on the contact of the line 80 between the system unit 104 and the cable 50.

While the system has been described as including an interconnecting cable 50, it is understood that, in the version of the invention shown in FIG. 1, the peripheral device 12 and the system unit 14 may be directly connected, with an electrical connection being provided by mating contacts within the device 12 and the system unit 14, without an intervening cable.

While the invention has been described as being applied within a peripheral device 12 that is a display unit, it is understood that the power switch 18 and drive indicator light 22 may be applied similarly within another type of peripheral device, such as a printer or keyboard without departing from the spirit and scope of the invention.

While the invention has been described in its preferred versions with some degree of particularity, it is understood that this description has been given only by way of example, and that numerous changes may be made in the combination and arrangement of parts without departing from the spirit and scope of the invention, as defined in the appended claims.

What is claimed is:

1. A computer system including:
   a system unit having a system unit power supply system performing a process of supplying at least one voltage level to components within the system unit;
   an electrical connection;
   a peripheral device connected to the system unit by the electrical connection, wherein the peripheral device includes a peripheral power supply system performing a process of supplying at least one voltage level to components within the peripheral device, and a main power switch electrically connected to the peripheral power supply system and to the system unit power supply system through the electrical connection to turn both of the power supply systems on and off together.

2. The computer system of claim 1, A computer system including:
   a system unit having a system unit power supply system performing a process of supplying at least one voltage level to components within the system unit;
   an electrical connection; and
   a peripheral device connected to the system unit by the electrical connection, wherein the peripheral device includes a peripheral power supply system performing a process of supplying at least one voltage level to components within the peripheral device, and a main power switch electrically connected to the peripheral power supply system and to the system unit power supply system through the electrical connection to turn both of the power supply systems on and off, wherein said main power switch is connected to said peripheral power supply system by a first power switching line and to said system unit power supply system by a second power switching line extending through said electrical connection, wherein said peripheral power supply system additionally supplies a first switching voltage relative to a ground potential in said peripheral device, wherein said first switching voltage is connected to said first power switching line through a resistor, wherein said first switching voltage remains on when said process of supplying at least one voltage level to components within said peripheral device is turned off, wherein said main power switch includes a first contact connecting said first power switching line to a ground potential within said peripheral device when said main power switch is operated, and wherein said peripheral power supply system includes a power sequencer causing said process of supplying at least one voltage level to components within said peripheral device to be turned on in response to said first power switching line being held at the ground potential in said peripheral device for a first time duration and additionally causing said process of supplying at least one voltage level to components within said peripheral device to be turned off in response to said first power switching line being held at the ground potential in said peripheral device for a second time duration, substantially longer than said first time duration.

3. The computer system of claim 2, wherein
   said main power switch additionally includes a second contact connecting said second power switching line to said ground potential within said peripheral device when said power switch is operated, and said system unit power supply system additionally supplies a second switching voltage relative to a ground potential in said system unit, said second switching voltage is connected to said second power switching line through a resistor, said second switching voltage remains on when said process of supplying at least one voltage level to components within said system unit is turned off, said system unit power supply system includes a power sequencer causing said process of supplying at least one voltage level to components within said system unit to be turned on in response to said second power switching line being held at the ground potential in said peripheral device for a first time duration and additionally causing said process of supplying at least one voltage level to components within said system unit to be turned off in response to said second power switching line being held at the ground potential in said peripheral device for a second time duration, substantially longer than said first time duration.

4. The computer system of claim 3, wherein said system unit additionally includes an auxiliary power switch connecting said second power switching line to ground potential in said system unit when said auxiliary power switch is operated.

5. The computer system of claim 2, wherein said second power switching line is additionally connected to said first switching voltage through a resistor and is additionally switched to said ground potential within said peripheral device when said auxiliary power switch is operated, and said system unit power supply system includes a power sequencer causing said process of supplying at least one voltage level to components within said system unit to be turned on in response to said second power switching line being held at the ground potential in said peripheral device for a first time duration and additionally causing said process of supplying at least one voltage level to components within said system unit to be turned off in response to said second power switching line being held at the ground potential in said peripheral device for a second time duration, substantially longer than said first time duration.

6. The computer system of claim 5, wherein said system unit power supply system additionally supplies a second switching voltage relative to a ground potential in said system unit said second switching voltage is connected to a third power switching line through a resistor, said system unit additionally includes an auxiliary power switch connecting said third power switching line to ground potential in said system unit when said auxiliary power switch is operated, and said third power switching line is additionally connected as an input to said power sequencer in said system unit power supply system to cause said process of supplying at least one voltage level to components within said system unit to be turned on in response to said third power switching line being held at the ground potential in said system unit for a first time duration and additionally causing said process of supplying at least one voltage level to components within said system unit to be turned off in response to said third power switching line being held at said ground potential in said system unit for a second time duration, substantially longer than said first time duration.

7. The computer system of claim 1, wherein said peripheral device additionally includes a drive indicator light electrically connected to a drive indicator signal line within said electrical connection;

said system unit additionally includes a hard disk drive and a drive adapter generating a signal applied to the drive indicator signal line to cause illumination of the drive indicator light as data is read from and written to the hard disk drive.

8. The computer system of claim 7, wherein said peripheral device additionally comprises a window having an appearance similar to surrounding external surfaces of said peripheral device when said drive indicator light is off, and said drive indicator light illuminates said window through a mask providing an illuminated pattern when said first indicator light is on.

9. The computer system of claim 1, wherein said peripheral device additionally comprises a display screen, and said electrical connection additionally includes at least one video data line for transmitting a video signal for generating an image on said display screen.

10. The peripheral device of claim 9, wherein said system unit runs in an operational state and in a suspended state, and said peripheral device additionally includes a power indicator light, a circuit determining from a video signal transmitted said through said connector whether a system unit electrically attached to said peripheral unit is running in an operational state or in a suspended state, and a circuit driving the power indicator light to provide a first visible indication when said system unit is running in the operational state and a second visible indication when said system unit is running in the suspended state.

11. A peripheral device for use with a system unit in a computer system, wherein the peripheral device comprises:

a connector including at least one contact terminal for electrically connecting the peripheral device to the system unit;

a power supply system performing a process of supplying at least one voltage level to components within the peripheral device, wherein said power supply system additionally supplies a switching voltage relative to a ground potential in said peripheral device, wherein said switching voltage is connected to said first power switching line through a resistor, and wherein said switching voltage remains on when said process of supplying at least one voltage level to components within said peripheral device is turned off, a power switch electrically connected to the power supply system by a first power switching line to turn the process of supplying at least one voltage level to components within the peripheral device on and off and to a first contact terminal within the connector by a second power switching line, wherein said power switch includes a first contact connecting said first power switching line to a ground potential when said power switch is operated, and wherein said power supply system includes a power sequencer causing said process of supplying at least one voltage level to components within said peripheral device to be turned on in response to said first power switching line being held at the ground potential in said peripheral device for a first time duration and additionally causing said process of supplying at least one voltage level to components within said peripheral device to be turned off in response to said first power switching line being held at the ground potential in said peripheral device for a second time duration, substantially longer than said first time duration.

12. The peripheral device of claim 11, wherein
said power switch additionally includes a second contact connecting said second power switching line to said ground potential within said peripheral device when said power switch is operated, and
said second power switching line is electrically floating within said peripheral device when said power switch is not operated.

13. The peripheral device of claim 11, wherein said second power switching line is additionally connected to said switching voltage through a resistor and is additionally switched to said ground potential within said peripheral device when said power switch is operated.

14. The peripheral device of claim 11, additionally comprising a first indicator light electrically connected to a second contact terminal within said connector.

15. The peripheral device of claim 14, wherein
said peripheral device additionally comprises a window having an appearance similar to surrounding external surfaces of said peripheral device when said first indicator light is off, and
said first indicator light illuminates said window through a mask providing an illuminated pattern when said first indicator light is on.

16. The peripheral device of claim 11, wherein
said peripheral device additionally comprises a display screen, and
said connector additionally includes at least one contact terminal for transmitting a video signal for generating an image on said display screen.

17. The peripheral device of claim 16, wherein said peripheral device additionally includes:
a power indicator light;
a circuit determining from a video signal transmitted through said connector whether a system unit electrically attached to said peripheral unit is running in an operational state or in a suspended state; and
a circuit driving the power indicator light to provide a first visible indication when said system unit is running in the operational state and a second visible indication when said system unit is running in the suspended state.

18. The computer system of claim 2, wherein
said peripheral device additionally includes a drive indicator light electrically connected to a drive indicator signal line within said electrical connection;
said system unit additionally includes a hard disk drive and a drive adapter generating a signal applied to the drive indicator signal line to cause illumination of the drive indicator light as data is read from and written to the hard disk drive.

19. The computer system of claim 18, wherein
said peripheral device additionally comprises a window having an appearance similar to surrounding external surfaces of said peripheral device when said drive indicator light is off, and
said drive indicator light illuminates said window through a mask providing an illuminated pattern when said first indicator light is on.

* * * * *